(12) United States Patent
Chen et al.

(10) Patent No.: US 10,313,278 B2
(45) Date of Patent: *Jun. 4, 2019

(54) CONTACT MATCHING METHOD, INSTANT MESSAGING CLIENT, SERVER AND SYSTEM

(71) Applicant: Tencent Technology (Shenzhen) Company Limited, Shenzhen (CN)

(72) Inventors: Xiaoqiang Chen, Shenzhen (CN); Kai Xie, Shenzhen (CN); Bo Wen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 77 days.

This patent is subject to a terminal disclaimer.

(21) Appl. No.: 15/448,310

(22) Filed: Mar. 2, 2017

(65) Prior Publication Data

US 2017/0180278 A1 Jun. 22, 2017

Related U.S. Application Data

(63) Continuation of application No. 14/091,307, filed on Nov. 26, 2013, now Pat. No. 9,634,964, which is a
(Continued)

(30) Foreign Application Priority Data

Nov. 12, 2012 (CN) .......................... 2012 1 0450258

(51) Int. Cl.
*H04L 12/58* (2006.01)
*H04R 29/00* (2006.01)
(Continued)

(52) U.S. Cl.
CPC ............ *H04L 51/04* (2013.01); *G10L 17/005* (2013.01); *G10L 25/03* (2013.01);
(Continued)

(58) Field of Classification Search
CPC . H04L 12/1822; H04L 51/20; H04L 12/1831; G06F 3/165; G06F 3/1423
(Continued)

(56) References Cited

U.S. PATENT DOCUMENTS 5,287,406 A 2/1994 Kakuishi
8,656,031 B2 * 2/2014 Iwase ................... G06Q 10/00
709/227

(Continued)

FOREIGN PATENT DOCUMENTS

CN 1794252 A 6/2006
CN 101573993 A 11/2009
(Continued)

OTHER PUBLICATIONS

Tencent Technology, ISRWO, PCT/CN2013/075959, Aug. 29, 2013, 9 pgs.
(Continued)

*Primary Examiner* — Tesfay Yohannes
(74) *Attorney, Agent, or Firm* — Morgan, Lewis & Bockius LLP

(57) ABSTRACT

A computer-implemented method of providing matching information to prospective first and second users is performed at a server, the method including: receiving first audio data and first user information; receiving second audio data, and second user information; storing a first timestamp of the first audio data and first user information and a second timestamp of the second audio data and second user information; performing analysis processing on the first audio data to obtain first feature information, and performing
(Continued)

analysis processing on the second audio data to obtain second feature information; judging whether the first timestamp and the second timestamp and the first feature information and the second feature information match; and if the first and second times of receipt and the first and second feature information match, sending the first user information to the second user and sending, by the server, the second user information to the first user.

20 Claims, 9 Drawing Sheets

Related U.S. Application Data continuation of application No. PCT/CN2013/075959, filed on May 21, 2013.

(51) Int. Cl.
*G10L 17/00* (2013.01)
*G10L 25/03* (2013.01)
*H04L 12/18* (2006.01)

(52) U.S. Cl.
CPC .......... *H04L 12/1822* (2013.01); *H04L 51/20* (2013.01); *H04L 51/38* (2013.01); *H04R 29/00* (2013.01)

(58) Field of Classification Search
USPC .......................... 709/206, 224, 228; 370/342
See application file for complete search history.

(56) References Cited

U.S. PATENT DOCUMENTS

| | | | |
|---|---|---|---|
| 8,660,055 B2 | 2/2014 | Ueda et al. | |
| 8,811,275 B2 | 8/2014 | Kim | |
| 9,118,940 B2 | 2/2015 | Valentine et al. | |
| 9,355,231 B2 | 5/2016 | Disraeli | |
| 2003/0040302 A1 | 2/2003 | Okada | |
| 2003/0069802 A1* | 4/2003 | Ramsey-Catan | G06Q 20/04 705/26.35 |
| 2008/0062948 A1* | 3/2008 | Ponnuswamy | H04W 28/18 370/342 |
| 2008/0190269 A1 | 8/2008 | Eom et al. | |
| 2010/0027541 A1* | 2/2010 | Eriksson | H04W 72/005 370/390 |
| 2010/0100618 A1* | 4/2010 | Kuhlke | H04L 43/00 709/224 |
| 2010/0172407 A1 | 7/2010 | Ramaswamy | |
| 2010/0174791 A1* | 7/2010 | Tian | H04L 51/04 709/206 |
| 2011/0071833 A1 | 3/2011 | Shi et al. | |
| 2011/0159890 A1 | 6/2011 | Fortescue et al. | |
| 2012/0140018 A1 | 6/2012 | Pikin et al. | |
| 2012/0236133 A1 | 9/2012 | Gallagher | |
| 2013/0166157 A1* | 6/2013 | Schleicher | A01D 41/1278 701/50 |
| 2013/0166391 A1* | 6/2013 | Blow | H04L 67/06 705/14.66 |
| 2014/0136637 A1 | 5/2014 | Chen et al. | |
| 2015/0127466 A1* | 5/2015 | Zhu | G06F 8/70 705/14.66 |
| 2018/0117484 A1* | 5/2018 | McCart-Pollak | A63H 3/28 |

FOREIGN PATENT DOCUMENTS

| | | |
|---|---|---|
| CN | 102547556 A | 7/2012 |
| CN | 102695121 A | 9/2012 |
| CN | 103812754 A | 5/2014 |
| CN | 104093463 A | 10/2014 |
| CN | 104415536 A | 3/2015 |
| WO | WO 2015/064362 A1 | 5/2015 |

OTHER PUBLICATIONS

Tencent Technology, IPRP, PCT/CN2013/075959, May 12, 2015, 6 pgs.

\* cited by examiner

CONTACT MATCHING METHOD, INSTANT MESSAGING CLIENT, SERVER AND SYSTEM

RELATED APPLICATIONS

This application is a continuation application of U.S. patent application Ser. No. 14/091,307, entitled "CONTACT MATCHING METHOD, INSTANT MESSAGING CLIENT, SERVER AND SYSTEM", filed Nov. 26, 2013, which is a continuation application of PCT Patent Application No. PCT/CN2013/075959, entitled "CONTACT MATCHING METHOD, INSTANT MESSAGING CLIENT, SERVER AND SYSTEM" filed on May 21, 2013, which claims priority to Chinese Patent Application No. 201210450258.2, entitled "CONTACT MATCHING METHOD, INSTANT MESSAGING CLIENT, SERVER AND SYSTEM" filed on Nov. 12, 2012, all of which are incorporated by reference in their entirety.

TECHNICAL FIELD

The disclosed embodiments relate generally to the field of electronic technologies, and in particular, to a method of exchanging contact information, an instant messaging client, a server and a system.

BACKGROUND

In order to use an instant messaging application, a user generally needs to manually input contact information to perform searching and matching. The operation is complicated, and does not allow contact matching with unknown people who use the same application. With the development of Location Based Service (LBS) technology, a contact matching scheme based on geographical locations was developed. LBS refined a conventional manual matching, simplified the operation, and improved the contact matching efficiency. LBS may use a Global System for Mobile communications (GSM) network, a Code Division Multiple Access (CDMA) network, or a Global Positioning System (GPS) to acquire location information of an instant messaging client, so as to provide a contact matching service for a user. For example, location information of a first instant messaging client is acquired by using the GPS, and location information of a second instant messaging client is acquired by using the CDMA network. The location information acquired by using different networks may have many differences, which results in an inaccurate matching result when contact matching is performed based on the geographical location information, thereby reducing intelligence of an instant messaging application system.

SUMMARY

In order to solve problems in the existing art, embodiments of the present invention provide a method of exchanging contact information, an instant messaging client, a server and a system, so as to implement accurate contact matching with high matching efficiency and simple operation.

Various embodiments of systems, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description" one will understand how the features of various embodiments enable a matching process between different networks.

In the embodiments of the present invention, the server may receive the audio data and the user information of the environment where the instant messaging client is located, judge whether different users are in the same environment at close time with reference to the feature information and the receiving timestamp of the audio data, and thereafter perform contact matching of users. Because the matching process is performed based on audio matching, the matching efficiency is high, and the operation procedure is simple. The matching process is not required to be performed with different networks, and matching may be precise to a specific environment where the contact is located, so that the matching result is more accurate.

Additional features and advantages of the invention will be set forth in the description that follows, and in part will be apparent from the description, or may be learned by practice of the invention. The objectives and advantages of the invention will be realized and attained by the method that is particularly pointed out in the written description and claims hereof as well as the appended drawings.

To achieve these and other advantages, and in accordance with the purpose of the invention, as embodied and broadly described, the present invention provides a method of exchanging contact information between prospective first and second users, comprising a non-transitory computer readable medium including a program, a processor, and a computer executable program code, the method comprising the steps of receiving first audio data and first user information from a first mobile device used by the first user and generating a first timestamp indicative of receipt of the first audio data and first user information at the server; receiving second audio data and second user information from a second mobile device used by the second user and generating a second timestamp indicative of receipt of the second audio data and second user information at the server; processing the first audio data to obtain first feature information; processing the second audio data to obtain second feature information; determining whether there is a match between the first user and the second user by comparing the respective feature information and timestamp associated with the first user and the second user; and if there is a match between the first user and the second user, sending the first user information to the second mobile device and the second user information to the first mobile device, respectively.

In another embodiment, the first audio data includes audio data of an environment surrounding the first mobile device and the second audio data includes audio data of an environment surrounding the second device.

In another embodiment, the steps of processing the first audio data and the second audio data further include: sequential sampling on a frequency of the first audio data to obtain at least one first sampling frequency; defining the first sampling frequency obtained through the sequential sampling as the first feature information of the first audio data; sequential sampling on a frequency of the second audio data to obtain at least one second sampling frequency; and defining the second sampling frequency obtained through sequential sampling as the second feature information of the second audio data.

In another embodiment, the step of determining whether there is a match between the first user and the second user further includes: comparing whether a time difference between the first timestamp and the second timestamp is within a preset difference scope; if the time difference is within the preset difference scope, comparing whether the first feature information of the first audio data and the second feature information of the second audio data have at least a predefined number of consecutive similar sampling frequencies, wherein a sampling frequency in the first feature information is deemed to be similar to a corresponding sampling frequency in the first feature information if a difference between the two sampling frequencies is less than a predefined threshold level; and determining that there is a match between the first user and the second user if the first feature information of the first audio data and the second feature information of the second audio data have at least the predefined number of consecutive similar sampling frequencies.

In another embodiment, the first user is any user logging in to an instant messaging application system through a first instant messaging client at the first mobile device; and the second user is any user, except the first user in the instant messaging application system, logging in to the instant messaging application system through a second instant messaging client at the first mobile device.

In another embodiment, the method further comprises after receiving the first audio data and the first user information from the first mobile device: determining whether an average frequency of the first audio data is within a preset frequency scope and whether an average volume of the first audio data is within a preset volume scope; and processing the first audio data to obtain the first feature information if the average frequency of the first audio data is within the preset frequency scope and the average volume of the first audio data is within the preset volume scope; and after receiving the second audio data and the second user information from the second mobile device: determining whether an average frequency of the second audio data is within the preset frequency scope and whether an average volume of the second audio data is within the preset volume scope; and processing the second audio data to obtain the second feature information if the average frequency of the second audio data is within the preset frequency scope and the average volume of the second audio data is within the preset volume scope.

In another embodiment, the method further comprises: before sending the first user information to the second mobile device and the second user information to the first mobile device, respectively: receiving and processing third audio data and third user information from a third mobile device used by a third user; determining which of the first, second, and third audio data for audio data has a highest average volume; designating, as a group administrator, one of the first, second, and third users whose associated audio data has the highest average volume; designating, as candidate group members, users other than the group administrator; sending user information of the candidate group members to an instant messaging client used by the group administrator; and establishing an instant messaging group in response to a group establishment request message returned from the instant messaging client used by the group administrator, wherein the group establishment request message comprises group identity information of an instant messaging group to be established, and user information of at least one initial group member selected by the group administrator from the candidate group members.

In another embodiment, the step of establishing an instant messaging group further includes: sending the group identity information, user information of the group administrator, and user information of initial group members to an instant messaging client used by an initial group member; designating the initial group member as a formal group member of to the instant messaging group in response to an acceptance-to-join message from the instant messaging client used by the initial group member; removing the user information of the initial group member in response to a refusal-to-join message from the instant messaging client used by the initial group member; and establishing the instant messaging group according to the group identity information, user information of designated full group members, and the user information of the group administrator.

In yet another embodiment, a method of exchanging contact information at a mobile device comprises: capturing audio data in response to an instruction from a first user of the mobile device through an instant messaging client; sending the captured audio data and user information of the first user to a remote server for matching audio data provided by other users within a predefined time window; and receiving, from the remote server, user information of a second user whose associated audio data matches the audio data associated with the first user.

In another embodiment, the first user is designated as a group administrator of an instant messaging group by the remote server, the method further comprises: displaying group establishment prompt information, wherein the group establishment prompt information includes user information of candidate group members; receiving group identity information of the instant messaging group provided by the first user, and user information of at least one initial group member selected by the first user among the user information of the candidate group members; and returning a group establishment request message to the remote server, wherein the group establishment request message includes the group identity information of the instant messaging group, and the user information of the at least one initial group member.

In another embodiment, the method further comprises: displaying group identity information of the instant messaging group and user information of initial group members including the first user; detecting a user operation on the displayed information; sending an acceptance-to-join message to the remote server if the user operation is to join the instant messaging group; and sending a refusal-to-join message to the remote server if the user operation is not to join the instant messaging group.

In still another embodiment, a server that supports exchange of contact information between prospective first and second users comprises one or more processors; memory; and a plurality of programs stored in the memory and to be executed by the one or more processors, the programs including instructions for: receiving first audio data and first user information from a first mobile device used by the first user and generating a first timestamp indicative of receipt of the first audio data and first user information at the server; receiving second audio data and second user information from a second mobile device used by the second user and generating a second timestamp indicative of receipt of the second audio data and second user information at the server; processing the first audio data to obtain first feature information; processing the second audio data to obtain second feature information; determining whether there is a match between the first user and the second user by comparing the respective feature information and timestamp associated with the first user and the second user; and if there is a match between the first user and the second user, sending the first user information to the second mobile device and the second user information to the first mobile device, respectively.

In another embodiment, the first audio data includes audio data of an environment surrounding the first mobile device and the second audio data includes audio data of an environment surrounding the second device.

In another embodiment, the instructions for processing the first audio data and the second audio data further include: a sampler module, configured to sequential sample a frequency of the first audio data to obtain at least one first sampling frequency and to sequential sample a frequency of the second audio data to obtain at least one second sampling frequency; and a defining module, configured to define the first sampling frequency obtained through sequential sampling as the first feature information of the first audio data and to define the second sampling frequency obtained through sequential sampling as the second feature information of the second audio data.

In another embodiment, the instruction for determining whether there is a match between the first user and the second user further includes: a judging module, configured to compare whether a time difference between the first timestamp and the second timestamp is within a preset difference scope, and if the time difference is within the preset difference scope, compare whether the first feature information of the first audio data and the second feature information of the second audio data have at least a predefined number of consecutive similar sampling frequencies, wherein a sampling frequency in the first feature information is deemed to be similar to a corresponding sampling frequency in the first feature information if a difference between the two sampling frequencies is less than a predefined threshold level; and determine that there is a match between the first user and the second user if the first feature information of the first audio data and the second feature information of the second audio data have at least the predefined number of consecutive similar sampling frequencies.

In another embodiment, the instruction for processing the first audio data to obtain first feature information further instructions for determining whether an average frequency of the first audio data is within a preset frequency scope and whether an average volume of the first audio data is within a preset volume scope; and processing the first audio data to obtain the first feature information if the average frequency of the first audio data is within the preset frequency scope and the average volume of the first audio data is within the preset volume scope; and the instruction for processing the second audio data to obtain second feature information further instructions for determining whether an average frequency of the second audio data is within the preset frequency scope and whether an average volume of the second audio data is within the preset volume scope; and processing the second audio data to obtain the second feature information if the average frequency of the second audio data is within the preset frequency scope and the average volume of the second audio data is within the preset volume scope.

In another embodiment, the programs further include instructions for: receiving and processing third audio data and third user information from a third mobile device used by a third user; determining which of the first, second, and third audio data for audio data has a highest average volume; designating, as a group administrator, one of the first, second, and third users whose associated audio data has the highest average volume; designating, as candidate group members, users other than the group administrator; sending user information of the candidate group members to an instant messaging client used by the group administrator; and establishing an instant messaging group in response to a group establishment request message returned from the instant messaging client used by the group administrator, wherein the group establishment request message comprises group identity information of an instant messaging group to be established, and user information of at least one initial group member selected by the group administrator from the candidate group members.

In another embodiment, the instruction for establishing an instant messaging group further includes instructions for: sending the group identity information, user information of the group administrator, and user information of initial group members to an instant messaging client used by an initial group member; designating the initial group member as a formal group member of to the instant messaging group in response to an acceptance-to-join message from the instant messaging client used by the initial group member; removing the user information of the initial group member in response to a refusal-to-join message from the instant messaging client used by the initial group member; and establishing the instant messaging group according to the group identity information, user information of designated full group members, and the user information of the group administrator.

In still another embodiment, a mobile device for exchanging contact information comprises one or more processors; memory; and programs stored in the memory and to be executed by the processors, the programs including instructions for: capturing audio data in response to an instruction from a first user of the mobile device through an instant messaging client; sending the captured audio data and user information of the first user to a remote server for matching audio data provided by other users within a predefined time window; and receiving, from the remote server, user information of a second user whose associated audio data matches the audio data associated with the first user.

In another embodiment, the first user is designated as a group administrator of an instant messaging group by the remote server and the programs further include instructions for: displaying group establishment prompt information, wherein the group establishment prompt information includes user information of candidate group members; receiving group identity information of the instant messaging group provided by the first user, and user information of at least one initial group member selected by the first user among the user information of the candidate group members; and returning a group establishment request message to the remote server, wherein the group establishment request message includes the group identity information of the instant messaging group, and the user information of the at least one initial group member.

In another embodiment, the programs further include instructions for: displaying group identity information of the instant messaging group and user information of initial group members including the first user; detecting a user operation on the displayed information; sending an acceptance-to-join message to the remote server if the user operation is to join the instant messaging group; and sending a refusal-to-join message to the remote server if the user operation is not to join the instant messaging group.

It is to be understood that both the foregoing general description and the following detailed description are exemplary and explanatory and are intended to provide further explanation of this invention as claimed.

BRIEF DESCRIPTION OF DRAWINGS

The aforementioned embodiments of the invention as well as additional embodiments will be more clearly understood as a result of the following detailed description of the various aspects of the invention when taken in conjunction with the drawings. Like reference numerals refer to corresponding parts throughout the several views of the drawings.

DETAILED DESCRIPTION

Reference will now be made in detail to the preferred embodiments of the present invention, examples of which are illustrated in the accompanying drawings.

In an embodiment of the present invention, an instant messaging client refers to a client installed with an instant messaging application, or a client where the instant messaging application can be used. The client may include, but is not limited to, a device such as a personal computer (PC), a tablet computer, a mobile phone, a smart phone, an e-reader, a notebook computer, and a vehicle terminal. User information includes registration information of a user in an instant messaging application system. User information may include, but is not limited to, information such as a user name, a password, a label, and attribute. An instant messaging group refers to a platform that gathers multiple users using the instant messaging application and having the same feature together for communication. The instant messaging group may include a group administrator and at least one group member, where the group administrator has a right of establishing group information and determining group members.

In one embodiment of the present invention, a contact matching request initiated by a first user through a first instant messaging client may be a nearby contact searching request or a contact group searching request. A first user is any user logging in to an instant messaging application system through the first instant messaging client; and a second user is any user, except the first user in the instant messaging application system, logging in to the instant messaging application system through a second instant messaging client. Audio data of an environment where the instant messaging client is located refers to various audio data capable of reflecting the environment where the instant messaging client is located. Thus, audio data of an environment may include audio data corresponding to a sound made by a human being or an animal in the environment, audio data corresponding to music in the environment, and the like.

The method of exchanging contact information provided in an embodiment of the present invention is described in detail with reference to FIG. 1 to FIG. 9 in the following.

Figure 1:
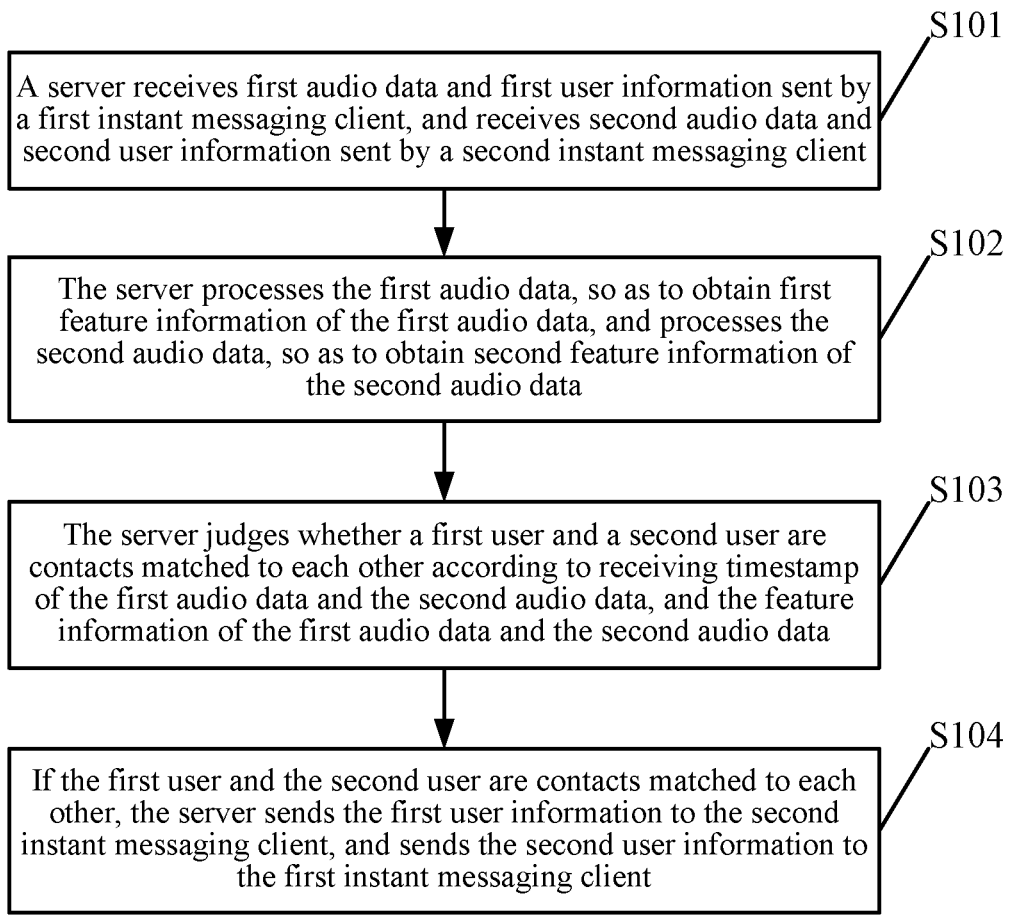
FIG. 1 is a flow chart of a method of exchanging contact information provided in an embodiment of the present invention.

FIG. 1 is a flow chart of a method of exchanging contact information provided in an embodiment of the present invention. In this embodiment, the procedure of the method of exchanging contact information is described from a server side.

In step S101 of FIG. 1, a server receives first audio data and first user information sent by a first instant messaging client, and receives second audio data and second user information sent by a second instant messaging client.

The first audio data is audio data of an environment where the first instant messaging client is located, and the second audio data is audio data of an environment where the second instant messaging client is located. When the first user intends to search for a nearby contact, the first user may initiate a contact matching request to the first instant messaging client. When receiving the contact matching request of the first user, the first instant messaging client monitors the first audio data of the environment where the first instant messaging client is located, and sends the monitored first audio data and the first user information to the server. At the approximate same time, the second instant messaging client sends the monitored second audio data and the second user information to the server. Thus, the server receives the first audio data and the first user information, and receives the second audio data and the second user information, respectively.

In Step S102, the server processes the first audio data, so as to obtain feature information of the first audio data, and processes the second audio data, so as to obtain feature information of the second audio data.

In another embodiment, after the first audio data and the first user information are received, the server may directly perform step S102 on the first audio data, so as to obtain the feature information of the first audio data. Similarly, after the second audio data and the second user information are received, the server may directly perform step S102 on the second audio data, so as to obtain the feature information of the second audio data.

In another embodiment of the present invention, after the first audio data and the first user information are received, and before step S102 is performed, the server may first judge whether an average frequency of the first audio data is within a preset frequency scope and whether an average volume of the first audio data is within a preset volume scope. If the average frequency of the first audio data is within the preset frequency scope and the average volume of the first audio data is within the preset volume scope, the server may then perform step S102 on the first audio data, so as to obtain the feature information of the first audio data. Similarly, after the second audio data and the second user information are received, and before step S102 is performed, the server may judge whether an average frequency of the second audio data is within the preset frequency scope and whether an average volume of the second audio data is within the preset volume scope. If the average frequency of the second audio data is within the preset frequency scope and the average volume of the second audio data is within the preset volume scope, the server may then perform step S102 on the second audio data so as to obtain the feature information of the second audio data.

The preset frequency scope and the preset volume scope may be set according to actual requirements, in order to filter invalid audio data before the server processes the audio data. This will reduce unnecessary data processing, and reduce processing burden of the server. Preferably, the preset frequency scope is 20 Hz-20 KHz, which is a frequency scope of sound made by a human being. The preset volume scope is −5 dB-140 dB, which is a volume scope of sound made by a human being. The preset frequency scope and the preset volume scope are preferably set, and the user may be encouraged to input a sound to the instant messaging client after sending the contact matching request. For example, the user may record valid audio data, such as saying "I am at the mall, please search a nearby contact." This will facilitate analysis processing of the server, improve interactivity between the device and the user at the same time, and improve the user experience of the user to an instant messaging application.

At step S103 of FIG. 1, the server judges whether a first user and a second user are contacts matched to each other by evaluating the time of receipt of the first audio data and the second audio data, and evaluating the feature information of the first audio data and the second audio data.

In this step, the server may record the receiving time when the audio data is received. The receiving time may be recorded as system time, for example: 18 o'clock on Aug. 20, 2012, or as 2012-8-20, 18:00:00; and the receiving time also may be a time stamp, for example, 1345456800.

In step S104, if the first user and the second user are contacts matched to each other, the server sends the first user information to the second instant messaging client, and sends the second user information to the first instant messaging client.

After the server sends the first user information to the second instant messaging client, the second instant messaging client may display the first user information. Thus, the second user is able to determine that the first user is a matched contact and is nearby. If the second user performs a confirmation operation, for example, clicks a "contact adding confirmation" button at an interface of the second instant messaging client, the second instant messaging client stores the first user information. If the second user performs a cancellation operation, for example, clicks a "contact adding cancellation" button at the interface of the second instant messaging client, the second instant messaging client rejects the first user information. At the same time, after the server sends the second user information to the first instant messaging client, the first instant messaging client may display the second user information, so that the first user is able to determine that the second user is a matched contact and is nearby. If the first user performs a confirmation operation, for example, clicks a "contact adding confirmation" button at an interface of the first instant messaging client, the first instant messaging client stores the second user information. If the first user performs a cancellation operation, for example, clicks a "contact adding cancellation" button at the interface of the first instant messaging client, the first instant messaging client rejects the second user information.

It should be noted that, in this embodiment, when a third, a fourth, or more instant messaging clients exist, the process of the server may be performed as described above.

Figure 2:
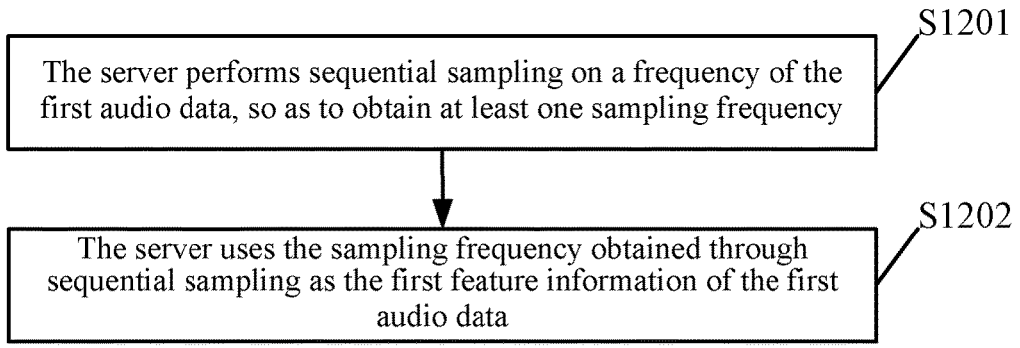
FIG. 2 is a flow chart of performing, by a server, analysis processing on first audio data provided in an embodiment of the present invention.

FIG. 2 is a flow chart of a server, performing analysis processing on first audio data provided in an embodiment of the present invention.

In step S1201 of FIG. 2, the server performs sequential sampling on a frequency of the first audio data, so as to obtain at least one sampling frequency.

In one embodiment of the present invention, the server draws a frequency of the first audio data in a time domain, so as to obtain a spectrum of the first audio data. The server divides the time in the time domain into multiple time nodes, for example, 0-t1, t1-t2, t2-t3, and each time node corresponds to a section of a spectrum of the first audio data. The server sequentially selects at least one time node sample, for example, two time nodes sequentially selected may be 0-t1, and t1-t2; or two time nodes sequentially selected may be t1-t2, and t2-t3. The server uses the highest frequency of each selected time node as the sampling frequency of the first audio data, and according to the foregoing example, the sampling frequency of the first audio data may be f10, f11; or f11, f12.

In another embodiment, the server draws a frequency of the first audio data in a time domain, so as to obtain a spectrum of the first audio data. The server divides the time in the time domain into multiple time nodes, for example, 0-t1, t1-t2, t2-t3, and each time node corresponds to a section of a spectrum of the first audio data. The server sequentially selects at least one time node, for example, two time nodes sequentially selected are 0-t1, t1-t2; or two time nodes sequentially selected are t1-t2, and t2-t3. The server uses the lowest frequency of each selected time node as the sampling frequency of the first audio data, and according to the foregoing example, the sampling frequency of the first audio data may be f10, f11; or f11, f12.

In yet another embodiment of the present invention, the server draws a frequency of the first audio data in the time domain, so as to obtain a spectrum of the first audio data. The server divides the time in the time domain into multiple time nodes, for example, t1, t2, t3; or, t1+a, t2+a, t3+a; where a may be a preset time interval value, for example, 0.3 s, and 0.2 s. Each time node may correspond to a frequency point of the spectrum in the first audio data, the frequency point of the spectrum may be superposed by multiple frequencies, and therefore, each time node may correspond to multiple frequencies superposed to form the frequency point in the first audio data. The server sequentially selects at least one time node sample, for example, two time nodes sequentially selected are t1, t2, or two time nodes sequentially selected are t1+0.3, t2+0.3. The server uses the highest frequency of each selected time node as the sampling frequency of the first audio data, and according to the foregoing example, the sampling frequency of the first audio data may be f'10, f'11.

In another embodiment, the server draws a frequency of the first audio data in the time domain, so as to obtain a spectrum of the first audio data. The server divides the time in the time domain into multiple time nodes, for example, t1, t2, t3; or, t1+a, t2+a, t3+a; where a may be a preset time interval value, for example, 0.3 s, and 0.2 s. Each time node may correspond to a frequency point of the spectrum in the first audio data, the frequency point of the spectrum may be superposed by multiple frequencies, and therefore, each time node may correspond to multiple frequencies superposed to form the frequency point in the first audio data. The server sequentially selects at least one time node sample, for example, two time nodes sequentially selected are t1, t2, or two time nodes sequentially selected are t1+0.3, t2+0.3. The server uses the lowest frequency of each selected time node as the sampling frequency of the first audio data, and according to the foregoing example, the sampling frequency of the first audio data may be f''10, f''11.

It should be noted that, in the foregoing sequential sampling, the selected time nodes in the first and the second embodiments are multiple successively selected time segments; the selected time nodes in the third embodiment manner and the fourth embodiment manner are multiple successively selected time points.

In step S1202, the server uses the sampling frequency obtained through sequential sampling as the first feature information of the first audio data.

Because the sampling frequency is obtained through sequential sampling, in this step, the server may sequentially store the sampling frequency obtained through sequential sampling. Therefore, the server sequentially stores the feature information of the first audio data. For example, a feature table may be used to store the sampling frequency of the first audio data, and the feature table is shown in Table 1, Table 2, or Table 3 in the following.

TABLE 1

Feature table of first audio data

| Time node | Sampling frequency |
|---|---|
| $0 - t_1$ | $f_{10}$ |
| $t_1 - t_2$ | $f_{11}$ |

TABLE 2

Feature table of first audio data

| Time node | Sampling frequency |
|---|---|
| $t_1$ | $f_{10}$ |
| $t_2$ | $f_{11}$ |

TABLE 3

Feature table of first audio data

| Time node | Sampling frequency |
|---|---|
| $t_1 + a$ | $f_{10}$ |
| $t_2 + a$ | $f_{11}$ |

It should be noted that the foregoing Table 1 to Table 3 are merely examples. The table may be a Hash Table, and may also be a table in another form known to those skilled in the art. When the time node and the sampling frequency vary, content of each item in each table may be changed accordingly, and other conditions may be analyzed similarly, which is not repeated herein.

Figure 3:
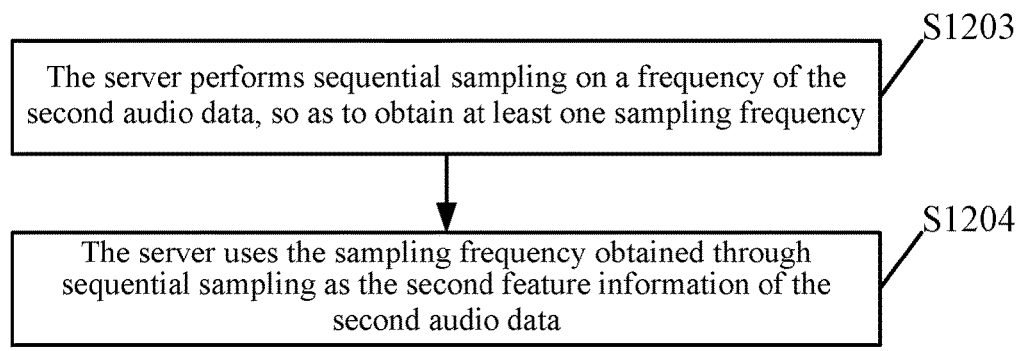
FIG. 3 is a flow chart of performing, by a server, analysis processing on second audio data provided in an embodiment of the present invention.

FIG. 3 is a flow chart of performing, by a server, analysis processing on second audio data provided in an embodiment of the present invention; and the method may include step S1203 to step S1204 in the following.

In step S1203, the server performs sequential sampling on a frequency of the second audio data, so as to obtain at least one sampling frequency.

In step S1204, the server uses the sampling frequency obtained through sequential sampling as the second feature information of the second audio data.

In this step, the server may sequentially store the sampling frequency obtained through sequential sampling. Thus the server sequentially stores the feature information of the second audio data. For example, a feature table may be used to store the sampling frequency of the second audio data, and the feature table is shown in Table 4, Table 5, or Table 6 in the following.

TABLE 4

Feature table of second audio data

| Time node | Sampling frequency |
|---|---|
| $0 - t_1$ | $f_{20}$ |
| $t_1 + t_2$ | $f_{21}$ |

TABLE 5

Feature table of first audio data

| Time node | Sampling frequency |
|---|---|
| $t_1$ | $f_{20}$ |
| $t_2$ | $f_{21}$ |

TABLE 6

Feature table of first audio data

| Time node | Sampling frequency |
|---|---|
| $t_{1+a}$ | $f_{20}$ |
| $t_{2+a}$ | $f_{21}$ |

It should be noted that, the foregoing Table 4 to Table 6 are merely examples. The table may be a Hash Table, and may also be a table in another form known to those skilled in the art. When the time node and the sampling frequency very, content in each item of each table may be changed accordingly, and other condition may be analyzed similarly, which is not repeated herein.

In this embodiment, the process that the server processes the second audio data is similar to the process that the server processes the first audio data. Accordingly step S1203 to step S1204 of this embodiment may be performed with reference to step S1201 to step S1202 shown in FIG. 2, which is not repeated herein. It should be noted that, in order to ensure accuracy of contact matching, when the server executes contact matching, the embodiment manner adopted for the analysis processing process of each audio data should be kept consistent. For example, when the server judges whether the first user and the second user are matched contacts by performing analysis processing of the first audio data and the second audio data, division of the unit time node should be consistent, the number of the sampling frequencies at the unit time node should be consistent, and the selection principle of the sampling frequency at the unit time node should be consistent. All of the sampling frequencies are the highest frequency in the unit time node or the lowest frequency in the unit time node.

Figure 4:
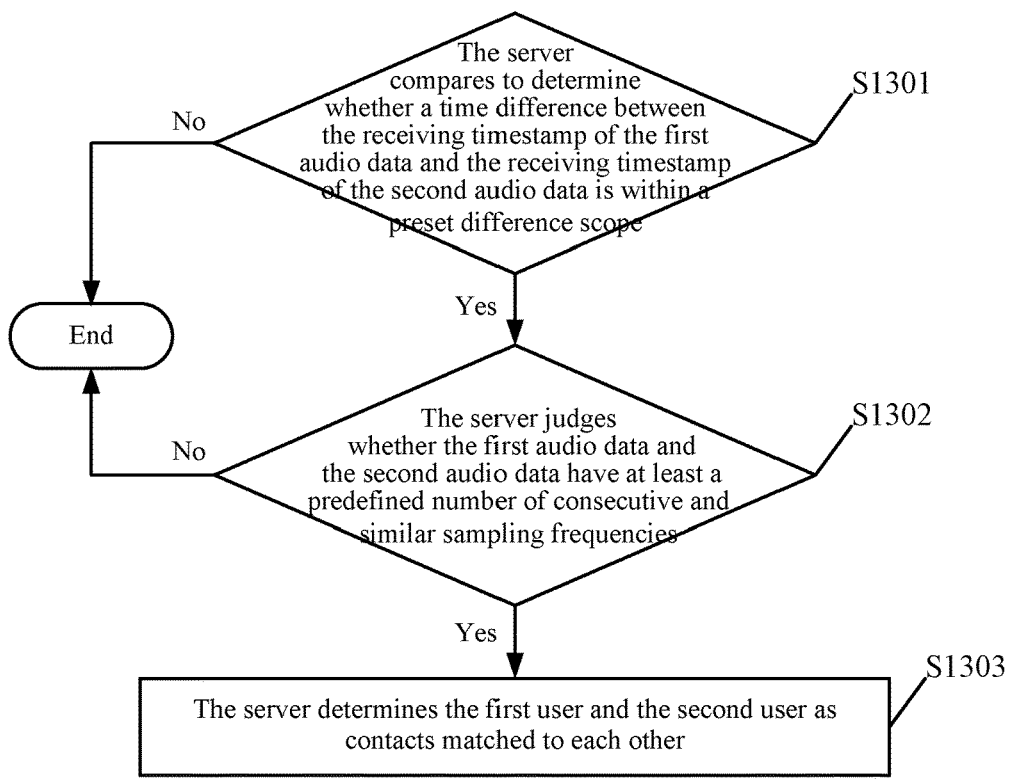
FIG. 4 is a flow chart of an embodiment of step S103 shown in FIG. 1.

FIG. 4 is a flow chart of an embodiment of step S103 shown in FIG. 1. Step S103 may specifically include step S1301 to step S1303 shown in FIG. 4 and discussed below.

In step S1301, the server determines whether a time difference between the receiving timestamp of the first audio data and the receiving timestamp of the second audio data is within a preset difference scope. If the comparison determines yes, the procedure proceeds to S1302; otherwise, the procedure ends.

The preset difference scope may be set according to actual requirements, for example, it may be set as −5 s-5 s or −10 s-10 s. Due to the mobility of the instant messaging client, the environment where the instant messaging client is located at different times may be different. For example, it is assumed that the first instant messaging client is a mobile phone. At 9:00 on one day, the first user initiates a contact matching request through the mobile phone at a park. Thus, the first audio data is audio data of the park, and the receiving time that the server receives the first audio data is 9:00 on that day. At 10:00 on the same day, the first user initiates contact matching to the mobile phone at a street, the first audio data is audio data of the street; and the receiving time that the server receives the first audio data is 10:00 on that day. Therefore, the receiving timestamp of the request should be considered first in contact matching in this embodiment of the present invention. Thus, the time receipt is compared to determine whether the time difference between the receiving timestamp of the first audio data and the receiving timestamp of the second audio data is within the preset difference scope.

In step S1302 shown in FIG. 4, the server judges whether the first audio data and the second audio data have at least a predefined number of consecutive and similar sampling frequencies. If the judging result is yes, the procedure proceeds to S1303; otherwise, the procedure ends.

For a sampling frequency of the first audio data, when a frequency difference between the sampling frequency of the first audio data and the sampling frequency of the second audio data is within a preset error scope, the sampling frequency of the first audio data and the sampling frequency of the second audio data are considered similar sampling frequencies. The preset error scope may be set according to actual requirements, such as a difference of software and hardware between the instant messaging clients and a processing capability of the instant messaging client. For example, the preset error scope may be set as −0.5 Hz-0.5 Hz, or −0.6 Hz-0.6 Hz. The preset number may be set according to actual requirements, and a maximum value of the preset number should be less than or equal to the number of the sampling frequencies of the audio data.

The sampling frequency of the server to the audio data may be used as the feature information of the audio data, which is sequentially stored in the feature table. This reduces comparison operations, and the feature table of the first audio data and the feature table of the second audio data may be compared one by one, so as to determine the number of similar sampling frequencies of the first audio data and the second audio data.

This step is illustrated with a specific example: It is assumed that the preset error scope is −0.5 Hz-0.5 Hz, and the preset number is 1; in the feature table of the first audio data, the first sampling frequency of a unit time node 0-$t_1$ is 5 Hz, the second sampling frequency of a time node $t_1$-t2 is 6 Hz, and the third sampling frequency of a time node $t_1$ $t_2$-t3 is 8 Hz. In the feature table of the second audio data, the first sampling frequency of a unit time node 0-$t_1$ is 5.4 Hz, the second sampling frequency of a time node $t_1$-t2 is 6.45 Hz, and the third sampling frequency of a time node $t_1$ $t_2$-t3 is 7.9 Hz. The judging process to determine if there is a similar sampling frequency is: content in the two feature tables is compared one by one. 5 Hz-5.4 Hz=−0.4 Hz, which is within the preset error scope, and thus, the sampling frequency 5 Hz of the first audio data and the sampling frequency 5.4 Hz of the second audio data are similar sampling frequencies. 6 Hz-6.45 Hz=−0.45 Hz, which is within the preset error scope, and thus, the sampling frequency 6 Hz of the first audio data and the sampling frequency 6.45 Hz of the second audio data are similar sampling frequencies. 8 Hz-7.9 Hz=0.1 Hz, which is within the preset error scope, and thus, the sampling frequency 8 Hz of the first audio data and the sampling frequency 7.9 Hz of the second audio data are similar sampling frequencies. After the foregoing determination, the first audio data and the second audio data have consecutive and similar sampling frequencies, and the number of the consecutive and similar sampling frequencies is 3, which is greater than a preset number. Accordingly, the procedure proceeds to perform step S1303.

In step S1303, the server determines the first user and the second user as contacts matched to each other.

With reference to the results of step S1301 and step S1302, if the time difference between the receiving timestamp of the first audio data and the receiving timestamp of the second audio data is within the preset difference scope, the feature information of the first audio data and the feature information of the second audio data are matched, and the first user and the second user appear in the same environment at similar times, the two users may be determined as contacts matched to each other. The first user is determined as a nearby contact matched to the second user, and the second user is determined as a nearby contact matched to the first user.

It is assumed that a user A and a user B are visiting an exhibition at the convention and exhibition center, and intend to search a nearby contact who is also visiting the exhibition. User A may log into an instant messaging application through a mobile phone A, initiate a contact matching request, so that the mobile phone A sends audio data A of the convention and exhibition center and information of the user A to a server. User B may log into the instant messaging application through a mobile phone B, and initiate the contact matching request. so that the mobile phone B sends audio data B of the convention and exhibition center and information of the user B to the server. A specific procedure of the method of exchanging contact information executed by the server in the embodiment of the present invention is as follows.

The server receives the audio data A and the information of the user A, judges whether an average frequency of the audio data A is within a preset frequency scope, and whether an average volume thereof is within a preset volume scope. If the result is no, the server returns matching failure information to the mobile phone A. If the result is yes, the server performs sequential sampling on the audio data A, so as to obtain the sampling frequency as the feature information of the audio data A. A feature table may be adopted to sequentially store the sampling frequency of the audio data A. The server receives the audio data B and the information of the user B, judges whether an average frequency of audio data B is within the preset frequency scope, and whether an average volume thereof is within the preset volume scope. If that result is no, the server returns matching failure information to the mobile phone B. If the result is yes, the server performs sequential sampling on the audio data B, so as to obtain the sampling frequency as the feature information of the audio data B. A feature table may be adopted to sequentially store the sampling frequency of the audio data B.

The server also judges whether a time difference between receiving timestamp of the audio data A and receiving timestamp of the audio data B is within a preset difference scope, and if yes, the feature table of the audio data A and the feature table of the audio data B are compared one by one, so as to determine whether the audio data A and the audio data B have at least a predefined number of consecutive and similar sampling frequencies. If the audio data A and the audio data B have consecutive and similar sampling frequencies with a number greater than or equal to the preset number, it indicates that the user A and the user B are at the convention and exhibition center at a similar time, and the user A and the user B are contacts matched to each other.

The server sends the information of user A to mobile phone B, and sends the information of user B to mobile phone A. User A may obtain from mobile phone A that user B is a nearby contact, and may perform an operation in the mobile phone A, so as to confirm adding user B as a contact, or may cancel adding the user B as a contact. At the same time, user B may obtain from the mobile phone B that the user A is a nearby contact, and may perform an operation in the mobile phone B, so as to confirm adding the user A as a contact or cancel adding the user B as a contact.

Therefore, in an embodiment of the present invention, the server may receive the audio data and the user information of the environment where the instant messaging client is located, judge whether different users are in the same environment at the same approximate time with reference to the feature information and the receiving timestamp of the audio data, thereby performing contact matching on the user. Because the matching process is performed based on audio matching, the matching efficiency is high, and the operation procedure is simple. The matching process does not need to be performed with different networks, and matching may be precise to a specific environment where the contact is located, so that the matching result is more accurate.

Figure 5:
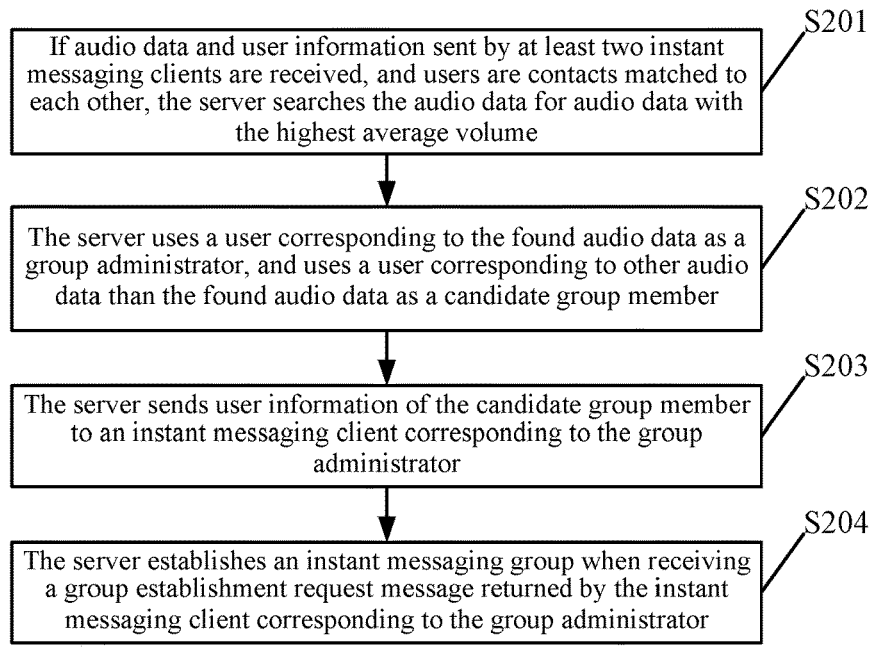
FIG. 5 is a flow chart of another method of exchanging contact information provided in an embodiment of the present invention.

FIG. 5 is a flow chart of another method of exchanging contact information provided in an embodiment of the present invention. In this embodiment, the procedure of the method of exchanging contact information is described from a server side, and puts emphasis on description of the procedure that the server uses for a contact matching scheme to establish an instant messaging group.

Step S201 illustrates that if audio data and user information sent by at least two instant messaging clients are received, and users are contacts matched to each other, the server searches the audio data for audio data with the highest average volume.

The processes that the server uses to judge whether the users are matched contacts are described in any embodiment in FIG. 1 to FIG. 4. In this step, the server searches for the audio data with the highest average volume from all audio data corresponding to the matched contacts.

In step S202, the server chooses a user with the highest average volume audio data as a group administrator, and chooses a user corresponding to other audio data as a candidate group member.

In step S203, the server sends user information of the candidate group member to an instant messaging client used by the group administrator.

In step S204, the server establishes an instant messaging group when receiving a group establishment request message returned by the instant messaging client used by the group administrator.

The group establishment request message may comprise group identity information of an instant messaging group to be established, and user information of at least one initial group member selected by the group administrator from the candidate group members.

Figure 6:
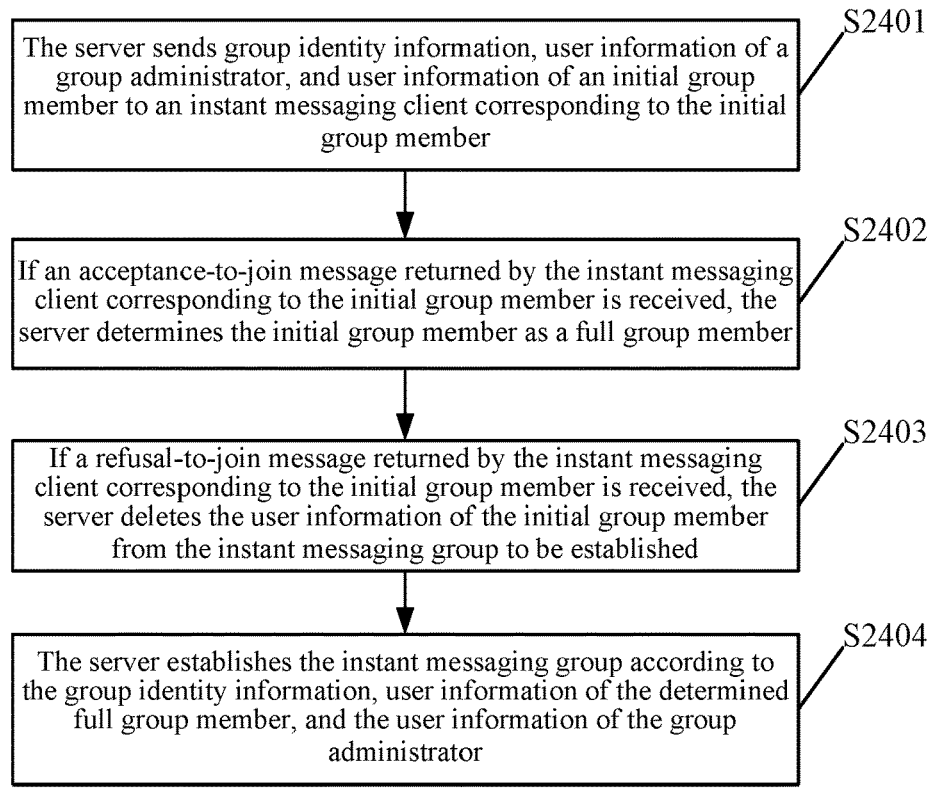
FIG. 6 is a flow chart of an embodiment of step S204 shown in FIG. 5.

FIG. 6 is a flow chart of an embodiment of step S204 shown in FIG. 5. Step S204 may specifically include step S2401 to step S2404 as follows.

In step S2401 of FIG. 6, the server sends the group identity information, user information of the group administrator, and user information of initial group members to an instant messaging client used by an initial group member.

In step S2402, if an acceptance-to-join message returned by the instant messaging client corresponding to the initial group member is received, the server determines the initial group member as a full group member.

In step S2403, if a refusal-to-join message returned by the instant messaging client corresponding to the initial group member is received, the server deletes the user information of the initial group member from the instant messaging group to be established.

In step S2404, the server establishes the instant messaging group according to the group identity information, user information of the determined full group member, and the user information of the group administrator.

The embodiments shown in FIG. 5 to FIG. 6 are used when the contact matching request initiated by the user is a contact group searching request, and the method for establishing an instant messaging group for each user by the server after contact matching is implemented through audio matching for any two users or more in the instant messaging application system is illustrated. A specific procedure of contact matching is discussed below.

It is assumed that a user A, a user B, and a user C are visiting an exhibition at the convention and exhibition center, and intend to search a nearby contact who is also visiting the exhibition. User A may log into an instant messaging application through a mobile phone A, and initiate a contact matching request so that the mobile phone A sends audio data A of the convention and exhibition center and information of the user A to the server. User B may log into the instant messaging application through a mobile phone B, and initiate the contact matching request so that the mobile phone B sends audio data B of the convention and exhibition center and information of the user B to the server. User C may log into the instant messaging application through a mobile phone C, and initiate the contact matching request so that the mobile phone C sends audio data C of the convention and exhibition center and information of the user C to the server. A specific procedure of the method of exchanging contact information executed by the server in the embodiment of the present invention is as follows.

The server determines that user A, user B, and user C are matched as contacts by using the method of exchanging contact information of embodiments shown in FIG. 1 to FIG. 4. Specifically user A and user B are determined as contacts matched to each other, user A and user C are determined as contacts matched to each other, and user B and user C are determined as contacts matched to each other.

The server searches audio data with the highest average volume from the audio data A, the audio data B and the audio data C. It is assumed that the found audio data is the audio data A, and thus, the server uses user A as a group administrator, and uses user B and user C as candidate group members. The server sends information of user B and user C to mobile phone A. User A may obtain from the mobile phone A that user B and user C are nearby contacts, and may perform an operation on the mobile phone A, where the operation may be a group establishment cancellation operation, and the mobile phone A sends a group establishment cancellation request to the server according to the operation of the user A. The server returns a matching failure message to the mobile phone A, the mobile phone B and the mobile phone C respectively. The operation of user A in the mobile phone may also be a group establishment request operation, including: inputting the group identity information, and selecting user B and/or user C as an initial group member (it is assumed that the user B and the user C are selected as initial group members herein). The mobile phone A sends a group establishment request message to the server according to the operation of user A, where the group establishment request message includes: the group identity information of an instant messaging group to be established. Thus, the group identity information input by user A, and user information of user B and user C selected by user A.

The server sends the group identity information, the information of user A, and the information of user C to the mobile phone B. User B may select a confirmation to join in a group or cancel joining in a group, and the mobile phone B sends a message to the server according to the operation of user B. Specifically, if user B performs a confirmation operation to confirm joining in a group, the mobile phone B sends an acceptance-to-join message to the server, and the server determines user B to be a full group member. If user B performs a cancellation operation to cancel joining, the mobile phone B sends a refusal-to-join message to the server, and the server deletes the information of user B. At the same time, the server sends the group identity information, the information of user A, and the information of user B to the mobile phone C. User C may select a confirmation to join in a group or cancel joining in a group, and the mobile phone C sends a message to the server according to the operation of user C. Specifically, if user C performs a confirmation operation to confirm joining in a group, the mobile phone C sends an acceptance-to-join message to the server, and the server determines user C to be a full group member. If user C performs a cancellation operation to cancel joining in a group, the mobile phone C sends a refusal-to-join message to the server, and the server deletes the information of user C. In this embodiment, it is assumed that user B and user C both perform the confirmation operation, the mobile phone B and the mobile phone C send the confirmation messages to the server, and the server establishes the instant messaging group according to the group identity information, the information of user A, the information of user B, and the information of user C, where the group administrator of the group is user A, and the members are user B and user C.

It should be noted that, in this embodiment, after the instant messaging group is established, the server saves relevant information of the instant messaging group, and may send the group identity information and the member information of the established group to the mobile phone A, the mobile phone B, and the mobile phone C respectively, so that user A, user B, and user C verify that they joined in the same instant messaging group, and may perform information interaction in the established instant messaging group.

As described in the foregoing method embodiment, the server may receive the audio data and the user information of the environment where the instant messaging client is located, judge whether different users are in the same environment at the same approximate time with reference to the feature information and the receiving timestamp of the audio data, thereby performing contact matching on the user. Because the matching process is performed based on audio matching, matching efficiency is high, and the operation procedure is simple. The matching process does not need to be performed with different networks, and matching may be precise to a specific environment where the contact is located, so that the matching result is more accurate. In addition, the server may further establish the instant messaging group based on the matched contact, thereby facilitating information interaction between contact users.

Figure 7:
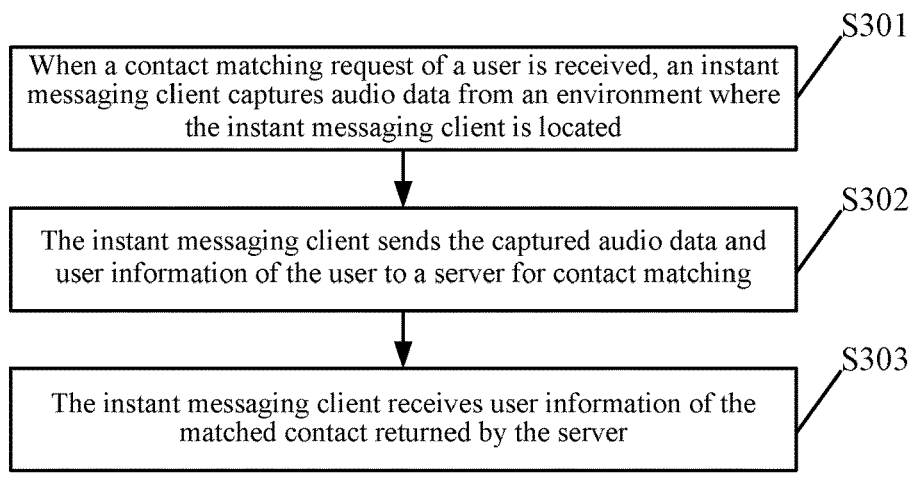
FIG. 7 is a flow chart of still another method of exchanging contact information provided in an embodiment of the present invention.

FIG. 7 is a flow chart of still another embodiment of a method of exchanging contact information of the present invention. In this embodiment, the method of exchanging contact information is described from an instant messaging client side. The method may include step S301 to step S303 as described below.

Step S301 illustrates that when a contact matching request of a user is received, an instant messaging client captures audio data from an environment where the instant messaging client is located.

In step S302, the instant messaging client sends the captured audio data and user information of the user to a server for contact matching.

In step S303, the instant messaging client receives user information of the matched contact returned by the server.

The contact matching request may be a nearby contact searching request, and the server may match a contact for the user by using the method of exchanging contact information of embodiments shown in FIG. 1 to FIG. 4. The contact matching request also may be a contact group searching request, and the server may match a contact for the user and establish an instant messaging group for each contact by using the method of exchanging contact information of embodiments shown in FIG. 5 to FIG. 6.

Figure 8:
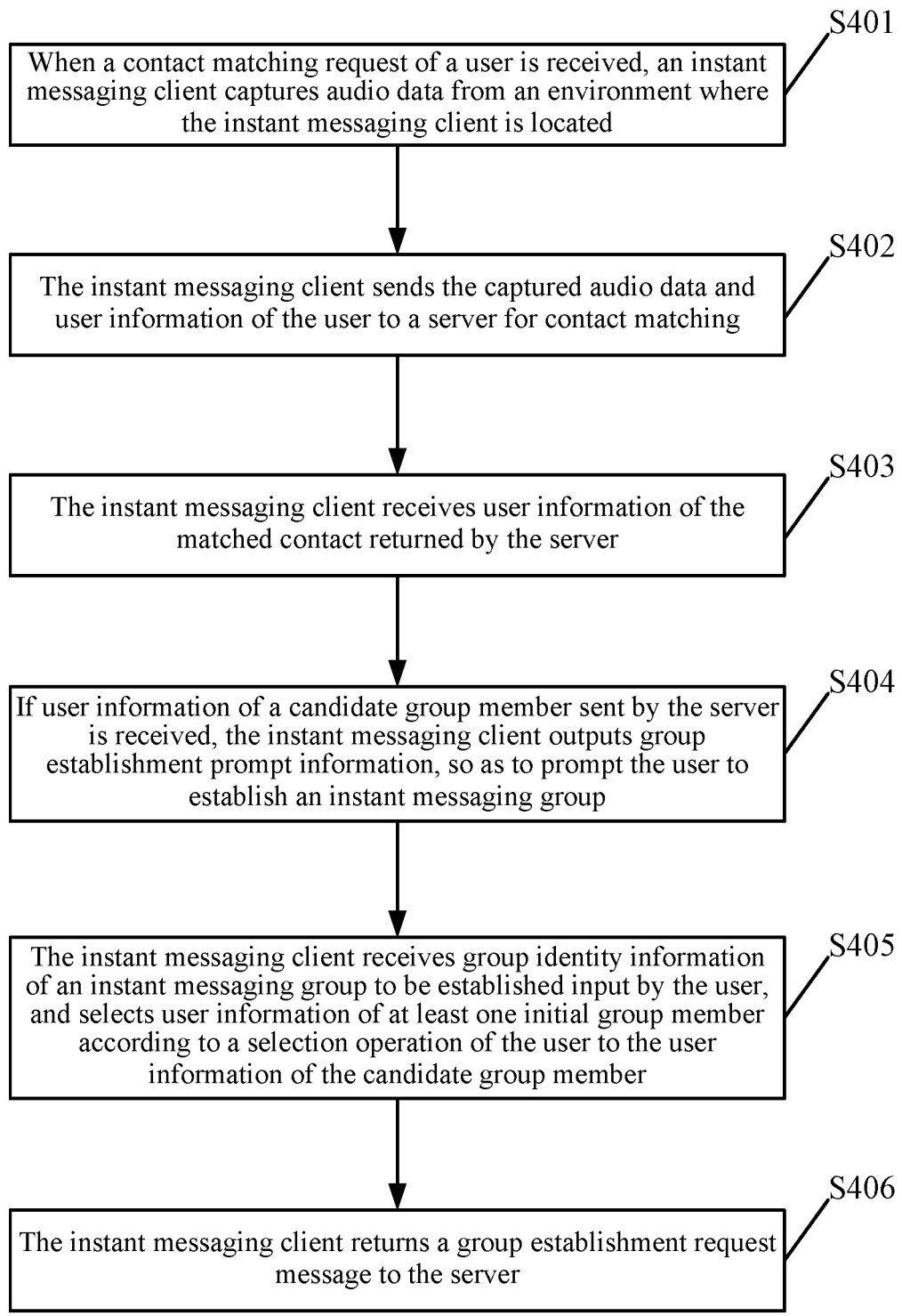
FIG. 8 is a flow chart of still another method of exchanging contact information provided in an embodiment of the present invention.

FIG. 8 is a flow chart of another embodiment of a method of exchanging contact information of the present invention. In this embodiment, the method of exchanging contact information is described from an instant messaging client side. Specifically, this method of exchanging contact information is executed by the instant messaging client when the user serves as a group administrator in the instant messaging group method, and may include step S401 to step S406 as described below.

In step S401 of this embodiment, when a contact matching request of a user is received, an instant messaging client captures audio data from an environment where the instant messaging client is located.

In step S402, the instant messaging client sends the captured audio data and user information of the user to a server for contact matching.

In step S403, the instant messaging client receives user information of the matched contact returned by the server.

Step S404 describes that if user information of a candidate group member sent by the server is received, the instant messaging client outputs group establishment prompt information. This will prompt the user to establish an instant messaging group, where the group establishment prompt information carries the user information of the candidate group member.

In step S405, the instant messaging client receives group identity information of the instant messaging group to be established. The instant message client also selects user information of at least one initial group member according to a selection operation of the user to the user information of the candidate group member.

In step S406, the instant messaging client returns a group establishment request message to the server. The group establishment request message includes the group identity information of an instant messaging group to be established, and the user information of the at least one initial group member.

Figure 9:
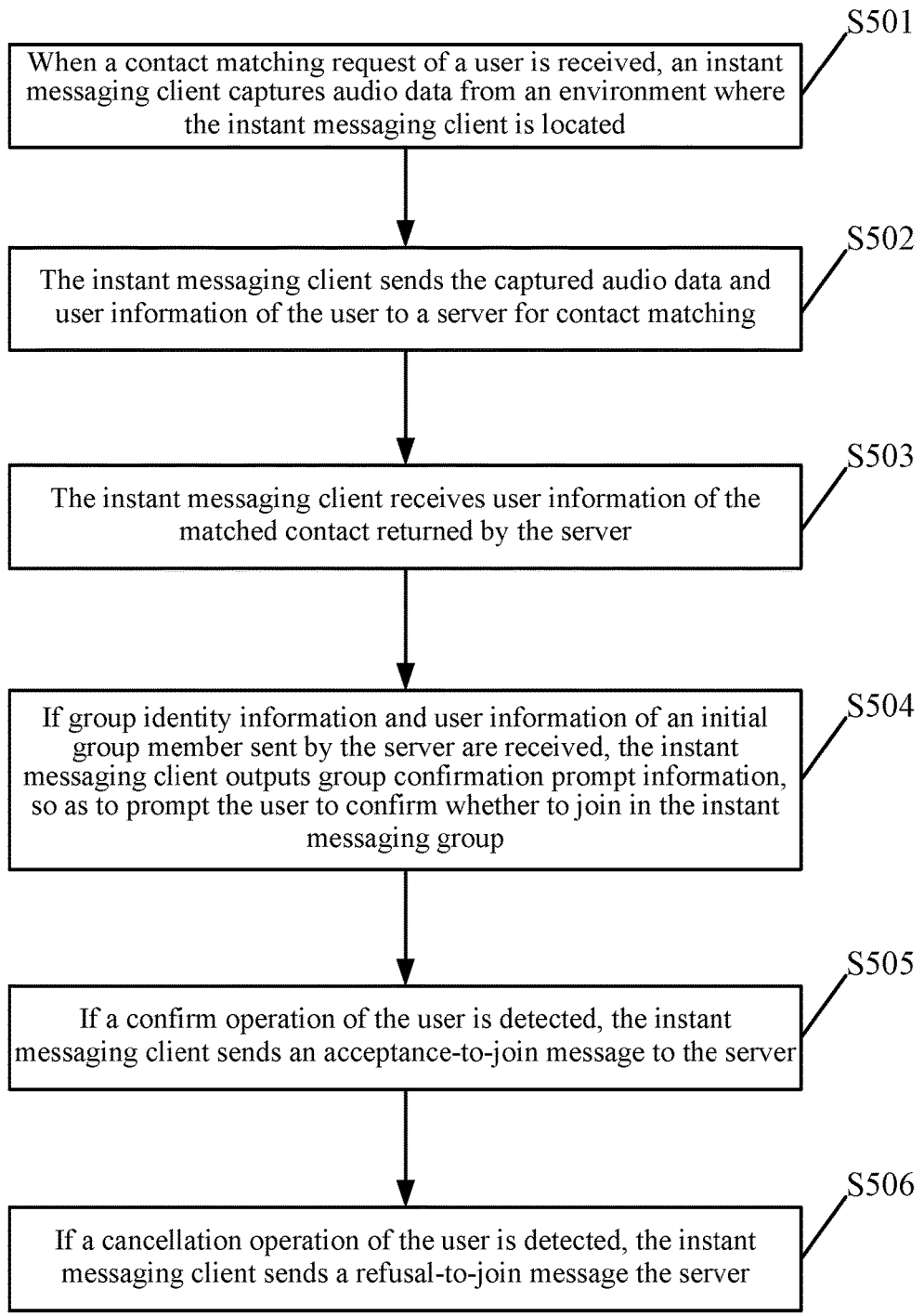
FIG. 9 is a flow chart of still another method of exchanging contact information provided in an embodiment of the present invention.

FIG. 9 is a flow chart of another embodiment of a method of exchanging contact information of the present invention. In this embodiment, the method of exchanging contact information is described from an instant messaging client side. Specifically, in this embodiment, the method of exchanging contact information executed by the instant messaging client occurs when the user serves as a member in an instant messaging group. The method may include step S501 to step S506 described below.

In step S501, when a contact matching request of a user is received, an instant messaging client captures audio data from an environment where the instant messaging client is located.

In step S502, the instant messaging client sends the captured audio data and user information of the user to a server for contact matching.

As shown in step S503, the instant messaging client receives user information of the matched contact returned by the server.

In step S504, if group identity information and user information of a initial group member sent by the server are received, the instant messaging client outputs group confirmation prompt information, so as to prompt the user to confirm whether to join in the instant messaging group. The group confirmation prompt information carries the group identity information and the user information of the initial group member.

In step S505, if a confirmation operation of the user is detected, the instant messaging client sends an acceptance-to-join message to the server. If a cancellation operation of the user is detected, the instant messaging client sends a refusal-to-join message to the server.

In the foregoing method embodiment, the instant messaging client may monitor the audio data of the environment where the instant messaging client is located, and may send the audio data and the user information to the server according to the contact matching request of the user, so that the server performs contact matching. Because the matching process is performed based on audio matching, matching efficiency is high, and the operation procedure is simple. The matching process does not need to be performed with different networks, and matching may be precise to a specific environment where the contact is located. Thus, the matching result is more accurate. Further, the instant messaging client also may enable the server to establish the instant messaging group based on the matched contact, thereby facilitating information interaction between contact users.

A server provided in an embodiment of the present invention is described in detail with reference to FIG. 10 to FIG. 14. It should be noted that, the server in the following may be applied to the foregoing method.

Figure 10:
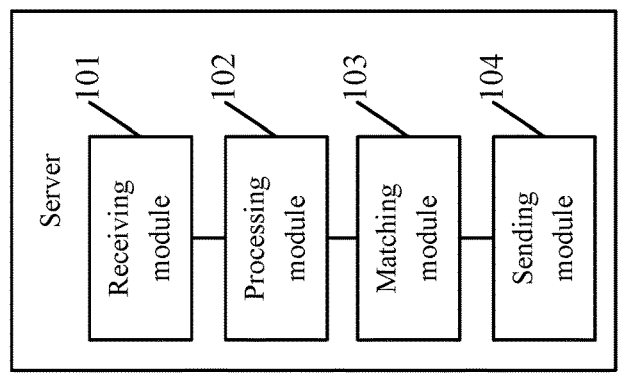
FIG. 10 is a schematic structural diagram of a server provided in an embodiment of the present invention.

FIG. 10 is a schematic structural diagram of a server provided in an embodiment of the present invention. The server may include a receiving module 101, a processing module 102, a matching module 103, and a sending module 104.

The receiving module 101 is configured to receive first audio data and first user information sent by a first instant messaging client, and receive second audio data and second user information sent by a second instant messaging client. The first audio data is audio data of an environment where the first instant messaging client is located, and the second audio data is audio data of an environment where the second instant messaging client is located.

The processing module 102 is configured to perform analysis processing on the first audio data, so as to obtain feature information of the first audio data, and perform analysis processing on the second audio data, so as to obtain feature information of the second audio data.

The matching module 103 is configured to judge whether a first user and a second user are contacts matched to each other according to receiving times of the first audio data and the second audio data, and also according to the feature information of the first audio data and the second audio data.

The sending module 104 is configured to send the first user information to the second instant messaging client when the first user and the second user are contacts matched to each other, and to send the second user information to the first instant messaging client.

Figure 11:
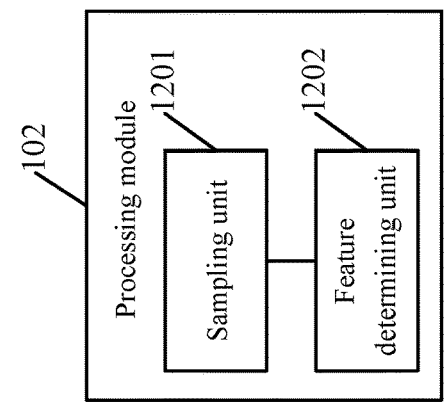
FIG. 11 is a schematic structural diagram of an embodiment of a processing module shown in FIG. 10.

FIG. 11 is a schematic structural diagram of an embodiment of a processing module shown in FIG. 10. The processing module 102 includes a sampling unit 1201 and a feature determining unit 1202.

The sampling unit 1201 is configured to perform sequential sampling on a frequency of the first audio data, so as to obtain at least one sampling frequency. In addition, sampling unit 1201 is configured to perform sequential sampling on a frequency of the second audio data, so as to obtain at least one sampling frequency.

The feature determining unit 1202 is configured to use the sampling frequency obtained through sequential sampling of the first audio data as the first feature information of the first audio data. Alternatively, the feature determining unit 1202 is configured to use the sampling frequency obtained through sequential sampling of the second audio data as the second feature information of the second audio data.

Figure 12:
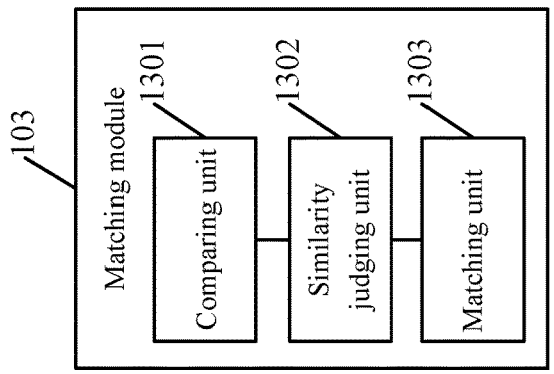
FIG. 12 is a schematic structural diagram of an embodiment of a matching module shown in FIG. 10.

FIG. 12 is a schematic structural diagram of an embodiment of a matching module shown in FIG. 10. The matching module 103 includes a comparing unit 1301, a similarity judging unit 1302 and a matching unit 1303.

The comparing unit 1301 is configured to compare times of receipt to determine whether a time difference between the receiving timestamp of the first audio data and the receiving timestamp of the second audio data is within a preset difference scope.

The similarity judging unit 1302 is configured to judge whether the first audio data and the second audio data have similar sampling frequencies with a number greater than or equal to a preset number, when the time difference is within the preset difference scope.

The matching unit 1303 is configured to determine the first user and the second user as contacts matched to each other, when a judging result of the similarity judging unit is yes.

For a sampling frequency of the first audio data, when a frequency difference between the sampling frequency of the first audio data and the sampling frequency of the second audio data is within a preset error scope, the sampling frequency of the first audio data and the sampling frequency of the second audio data are similar sampling frequencies.

Figure 13:
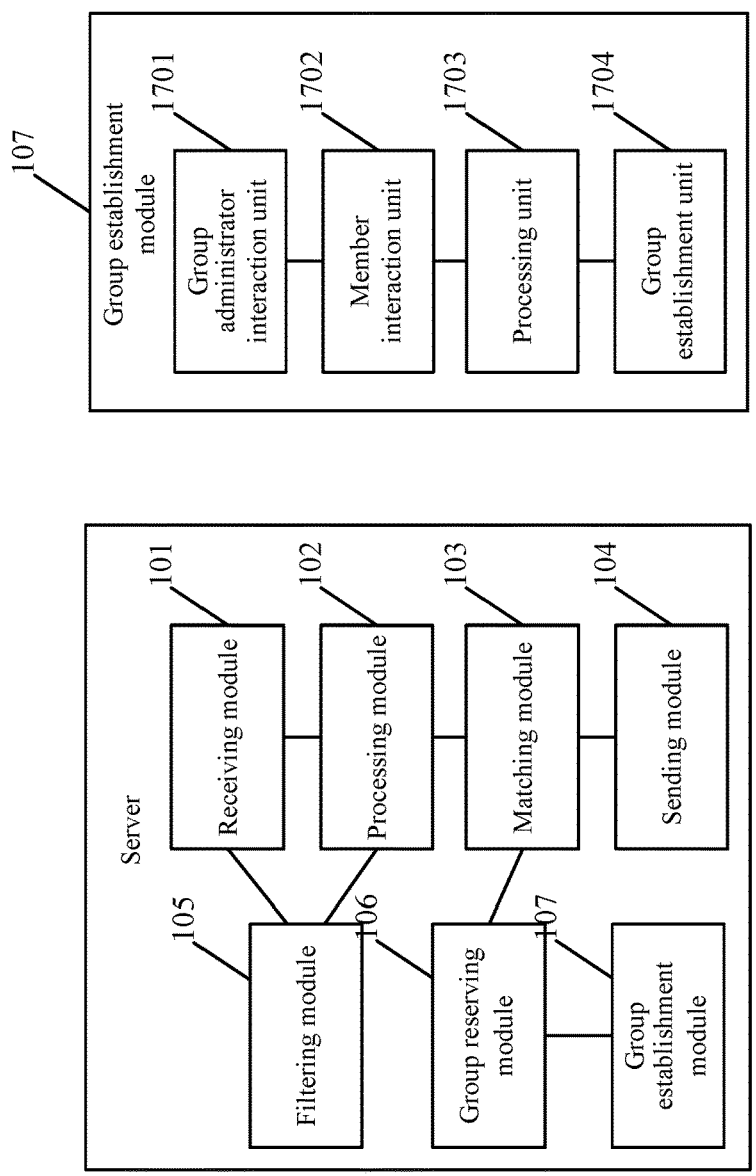
FIG. 13 is a schematic structural diagram of another server provided in an embodiment of the present invention.

The first user is any user logging in to an instant messaging application system through the first instant messaging client; and the second user is any user, except the first user in the instant messaging application system, logging in to the instant messaging application system through the second instant messaging client FIG. 13 is a schematic structural diagram of another server provided in an embodiment of the present invention. The server may include a receiving module 101, a processing module 102, a matching module 103, a sending module 104, a filtering module 105, a group reserving module 106, and a group establishment module 107. For structures of the receiving module 101, the processing module 102, matching module 103, and sending module 104, reference may be made to relevant descriptions in embodiments shown in FIG. 10 to FIG. 12, which are not described again.

After the first audio data and the first user information sent by the first instant messaging client are received, the filtering module 105 is configured to judge whether an average frequency of the first audio data is within a preset frequency scope, whether an average volume of the first audio data is within a preset volume scope, if the average frequency of the first audio data is within the preset frequency scope, and if the average volume of the first audio data is within the preset volume scope, and notify the processing module of performing analysis processing on the first audio data.

The filtering module also is configured to, after the second audio data and the second user information sent by the second instant messaging client are received, judge whether an average frequency of the second audio data is within the preset frequency scope, whether an average volume of the second audio data is within the preset volume scope, if the average frequency of the second audio data is within the preset frequency scope, if the average volume of the second audio data is within the preset volume scope, and notify the processing module of performing analysis processing on the second audio data.

If the audio data and the user information sent by at least two instant messaging clients are received, and the users are contacts matched to each other, the group reserving module 106 is configured to search the audio data for audio data with the highest average volume, use a user corresponding to the found audio data as a group administrator, and use a user corresponding to other audio data than the found audio data as a candidate group member.

The group establishment module 107 is configured to send user information of the candidate group member to an instant messaging client used by the group administrator. When a group establishment request message returned by the instant messaging client used by the group administrator is received, the group establishment module 107 may establish instant messaging group.

The group establishment request message may comprises group identity information of an instant messaging group to be established, and user information of at least one initial group member selected by the group administrator from the candidate group members.

Figure 14:
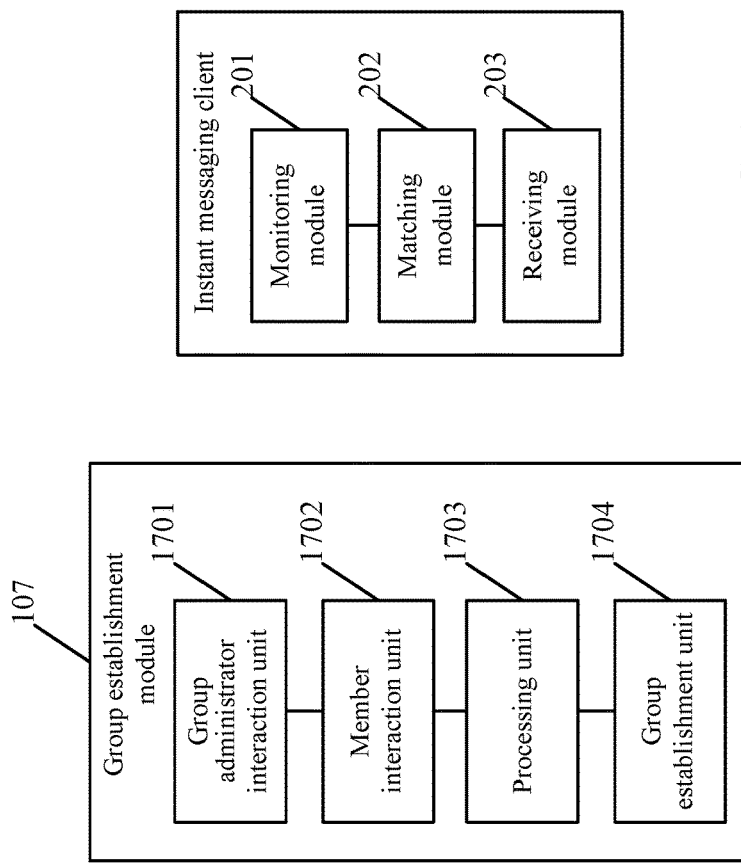
FIG. 14 is a schematic structural diagram of an embodiment of a group establishment module shown in FIG. 13.

FIG. 14 is a schematic structural diagram of an embodiment of a group establishment module shown in FIG. 13. The group establishment module 107 may include a group administrator interaction unit 1701, a member interaction unit 1702, a processing unit 1703, and a group establishment unit 1704.

The group administrator interaction unit 1701 is configured to send user information of the candidate group member to the instant messaging client used by the group administrator, and to receive the group establishment request message returned by the instant messaging client used by the group administrator.

The member interaction unit 1702 is configured to send group identity information and user information of initial group members to an instant messaging client used by an initial group member; and to receive a message returned by the instant messaging client corresponding to the initial group member.

The processing unit 1703 is configured to, if the member interaction unit receives an acceptance-to-join message returned by the instant messaging client corresponding to the initial group member, determine the initial group member as a full group member; and if the member interaction unit receives a refusal-to-join message returned by the instant messaging client corresponding to the initial group member, delete the user information of the initial group member.

The group establishment unit 1704 is configured to establish the instant messaging group according to the group identity information, user information of the determined full group member, and the user information of the group administrator.

It should be noted that the structure and the function of the server shown in FIG. 10 to FIG. 14 may be specifically implemented according to the method in the method embodiments shown in FIG. 1 to FIG. 6. For a specific embodiment process thereof, reference may be made to relevant description in the method embodiment, which is not repeated again.

As described with the foregoing server embodiment, the server may receive the audio data and the user information of the environment where the instant messaging client is located, judge whether different users are in the same environment at the same time with reference to the feature information and the receiving timestamp of the audio data, and thereby perform contact matching. Because the matching process is performed based on audio matching, matching efficiency is high, and the operation procedure is simple. The matching process does not need to be performed with different networks, and matching may be precise to a specific environment where the contact is located, so that the matching result is more accurate. In addition, the server may further establish the instant messaging group based on the matched contact, thereby facilitating information interaction between contact users.

An instant messaging client provided in an embodiment of the present invention is described in detail with reference to FIG. 15 to FIG. 17. It should be noted that the instant messaging client below may be applied to the method embodiments shown in FIG. 1 to FIG. 9, and may also be applied to the server embodiments shown in FIG. 10 to FIG. 14.

Figure 15:
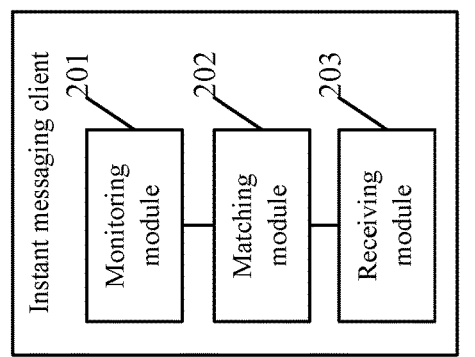
FIG. 15 is a schematic structural diagram of an instant messaging client provided in an embodiment of the present invention.

FIG. 15 is a schematic structural diagram of an instant messaging client provided in an embodiment of the present invention. The instant messaging client includes a monitoring module 201, a matching module 202, and a receiving module 203.

When a contact matching request of a user is received, the monitoring module 201 is configured to monitor audio data of an environment where the instant messaging client is located. The matching module 202 is configured to send the captured audio data and user information of the user to a server for contact matching. The receiving module 203 is configured to receive user information of the matched contact returned by the server.

Figure 16:
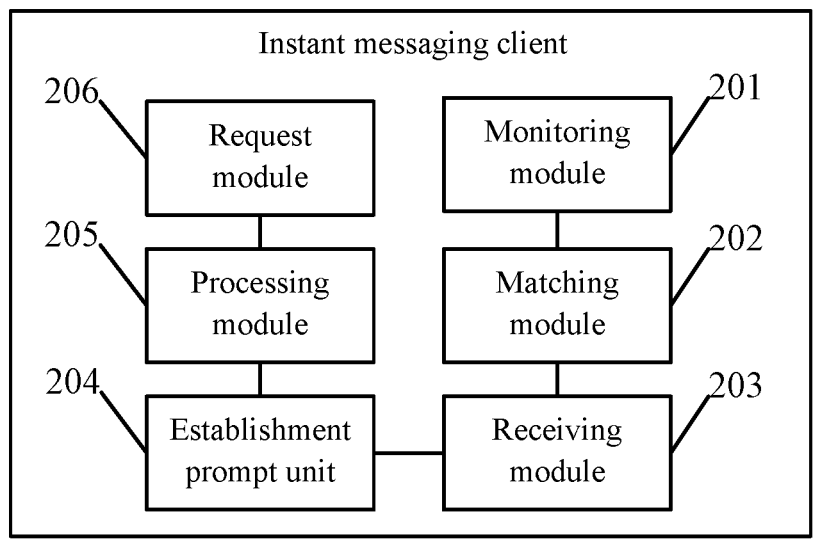
FIG. 16 is a schematic structural diagram of another instant messaging client provided in an embodiment of the present invention.

FIG. 16 is a schematic structural diagram of another instant messaging client according to an embodiment of the present invention. A specific structure of the instant messaging client when a user serves as a group administrator in an instant messaging group is illustrated in this embodiment.

The instant messaging client may include a monitoring module 201, a matching module 202, a receiving module 203, an establishment prompt unit 204, a processing module 205, and a request module 206. For structures of the monitoring module 201, the matching module 202, and the receiving module 203, reference may be made to relevant descriptions in the embodiment shown in FIG. 15, which are not described again.

The establishment prompt unit 204 is configured to, if user information of a candidate group member sent by the server is received, output group establishment prompt information, so as to prompt the user to establish an instant messaging group. The group establishment prompt information carries the user information of the candidate group member.

The processing module 205 is configured to receive group identity information of an instant messaging group to be established input by the user, and to select user information of at least one initial group member according to a selection operation of the user to the user information of the candidate group member.

The request module 206 is configured to return a group establishment request message to the server, where the group establishment request message may include the group identity information of the instant messaging group, and the user information of at least one initial group member selected from the candidate group member.

Figure 17:
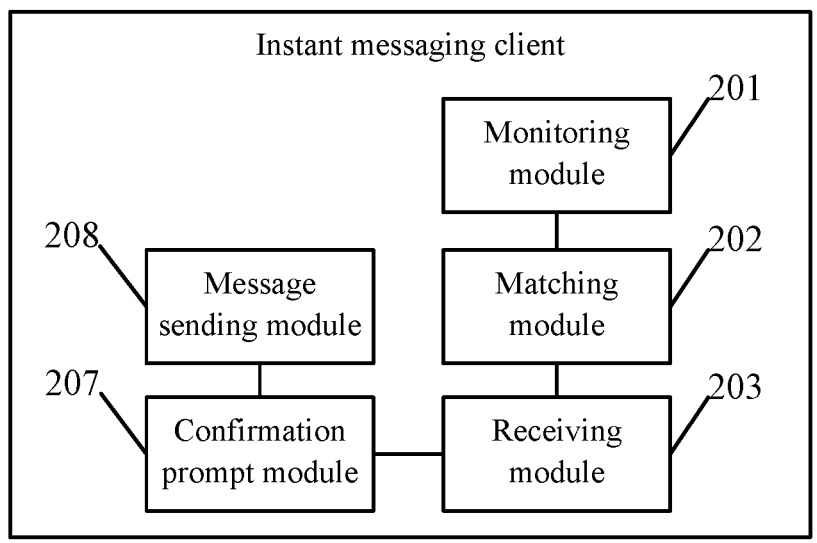
FIG. 17 is a schematic structural diagram of still another instant messaging client provided in an embodiment of the present invention.

FIG. 17 is a schematic structural diagram of still another instant messaging client provided in an embodiment of the present invention. A specific structure of the instant messaging client when a user serves as a member in an instant messaging group is illustrated in this embodiment. The instant messaging client may include a monitoring module 201, a matching module 202, a receiving module 203, a confirmation prompt module 207, and a message sending module 208. For structures of the monitoring module 201, the matching module 202, and the receiving module 203, reference may be made to relevant descriptions in the embodiment shown in FIG. 15, which are not described again.

If the group identity information and the user information of the initial group member sent by the server are received, the confirmation prompt module 207 is configured to output group confirmation prompt information, so as to prompt the user to confirm whether to join in the instant messaging group, where the group confirmation prompt information carries the group identity information and the user information of the initial group member.

The message sending module 208 is configured, if a confirmation operation of the user is detected, to send an acceptance-to-join message to the server. If a cancellation operation of the user is detected, the message sending module 208 is configured to send a refusal-to-join message to the server.

It should be noted that the structure and the function of the instant messaging client shown in FIG. 15 to FIG. 17 may be specifically implemented according to the method in the method embodiments shown in FIG. 7 to FIG. 9. For a specific embodiment process thereof, reference may be made to relevant descriptions in the method embodiments, which is not repeated again.

As described in the foregoing instant messaging client embodiment, the present invention, the instant messaging client may monitor the audio data of the environment where the instant messaging client is located, and may send the audio data and the user information to the server according to the contact matching request of the user, so that the server performs contact matching. Because the matching process is performed based on audio matching, matching efficiency is high, and the operation procedure is simple. The matching process does not need to be performed with different networks, and matching may be precise to a specific environment where the contact is located, so that the matching result is more accurate. Further, the instant messaging client also may enable, according to the contact matching request of the user, the server to establish the instant messaging group based on the matched contact, thereby facilitating information interaction between contact users.

An embodiment of the present invention further provides an instant messaging application system. The system includes the server in embodiments shown in FIG. 10 to FIG. 14, and may further include at least one instant messaging client in embodiments shown in FIG. 15 to FIG. 17. It should be noted that, the system may be applied to the method of exchanging contact information described in any embodiment of FIG. 1 to FIG. 9.

As described in the foregoing embodiments, in the embodiment of the present invention, the instant messaging client may monitor the audio data of the environment where the instant messaging client is located, and may send the audio data and the user information to the server according to the contact matching request of the user, so that the server may judge whether different users are in the same environment at close time with reference to the feature information and the receiving timestamp of the audio data, thereby performing contact matching on the user. Because the matching process is performed based on audio matching, matching efficiency is high, and the operation procedure is simple. The matching process does not need to be performed with different networks, and matching may be precise to a specific environment where the contact is located, so that the matching result is more accurate. Further, the instant messaging client may also enable, according to the contact matching request of the user, the server to establish the instant messaging group based on the matched contact, thereby facilitating information interaction between contact users.

Persons of ordinary skill in the art should understand that, all or a part of processes in the method according to the embodiments may be accomplished by relevant hardware under instructions of a computer program. The program may be stored in a computer-readable storage medium. When the program is executed, the process of the method according to the embodiments of the present invention is performed. The storage medium may be a magnetic disk, an optical disk, a read-only memory (Read-Only Memory, ROM), or a random access memory (Random Access Memory, RAM).

The above descriptions are merely preferred embodiments of the present invention, but are not intended to limit the present invention. Any equivalent modification made according to claims of the present invention should fall within the scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the reserved listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain principles of the invention and its practical applications, to thereby enable others skilled in the art to best utilize the invention and various embodiments with various modifications as are suited to the particular use contemplated. Embodiments include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of establishing an instant messaging group, the method comprising:
    at a server having one or more processors and memory storing programs to be executed by the processors:
        receiving, from each of a plurality of mobile devices, audio data generated by the mobile device and a user identifier associated with the mobile device, and associating, with the audio data, a timestamp indicative of receipt of the audio data at the server;
        selecting, among a plurality of user identifiers, a subset of user identifiers whose corresponding audio data and timestamps satisfy predefined similarity criteria, wherein:
            the subset of user identifiers includes a first user identifier associated with a first mobile device, a second user identifier associated with a second mobile device, and a third user identifier associated with a third mobile device;
            the predefined similarity criteria require that (i) the timestamps of the audio data corresponding to the subset of user identifiers be within a predefined time scope and (ii) the audio data corresponding to the subset of user identifiers have frequency characteristics within a predefined frequency characteristic range;
        sending, to the first mobile device, an instant messaging group establishment prompt message including the second user identifier and the third user identifier; and
        establishing an instant messaging group including the first user identifier, the second user identifier, and the third user identifier after receiving an instant messaging group establishment request message from an instant messaging client associated with the first mobile device.

2. The method according to claim 1, further comprising:
    canceling the establishment of an instant messaging group after receiving an instant messaging group cancellation request message from the instant messaging client.

3. The method according to claim 1, wherein the instant messaging group establishment request message includes a group identifier and establishing the instant messaging group further includes:
    identifying the first user identifier as a group administrator and the second user identifier as a candidate group member;
    forwarding the group identifier and the first user identifier as the group administrator to the second mobile device; and
    converting the second user identifier from the candidate group member to a full group member after receiving an acceptance-to-join message from the second mobile device.

4. The method according to claim 3, wherein establishing the instant messaging group further includes:
    identifying the third user identifier as a candidate group member;
    forwarding the group identifier and the first user identifier as the group administrator to the third mobile device; and removing the third user identifier from the instant messaging group after receiving a refusal-to-join message from the third mobile device.

5. The method according to claim 1, wherein the first user identifier is chosen as a group administrator for receiving the instant messaging group establishment prompt message when its audio data has an average volume higher than that of the second user identifier and the third user identifier.

6. The method according to claim 1, wherein selecting, among a plurality of user identifiers, the subset of user identifiers further comprises:
obtaining a set of sampled audio frequencies by sequentially sampling predefined audio frequencies of the audio data associated with each of the subset of user identifiers; and
wherein the audio data associated with the first user identifier, the second user identifier and the third user identifier include associated sets of sampled audio frequencies each having at least a predefined number of consecutive sampling frequencies, wherein a difference between the first user identifier, the second user identifier and the third user identifier each consecutive sampling frequency is less than a predefined threshold level.

7. The method according to claim 1, wherein:
the first user identifier is any user identifier logging into an instant messaging application system through a first instant messaging client at the first mobile device; and
the second user identifier is any user, except the first user identifier in the instant messaging application system, logging in to the instant messaging application system through a second instant messaging client at the second mobile device.

8. The method according to claim 1, further comprising:
after receiving a first audio data from the first mobile device:
determining whether an average audio frequency of the first audio data is within a preset frequency scope and whether an average volume of the first audio data is within a preset volume scope; and
sending a failure message to the first mobile device when the average audio frequency of the first audio data is not within the preset frequency scope or the average volume of the first audio data is not within the preset volume scope, wherein the failure message is used for prompting a user of the first mobile device to regenerate the audio data.

9. The method according to claim 1, wherein the audio data generated by the mobile device includes audio data of an environment sound surrounding the mobile device.

10. A server for establishing an instant messaging group, comprising:
one or more processors;
memory; and
a plurality of programs stored in the memory and to be executed by the one or more processors, the programs including instructions for:
receiving, from each of a plurality of mobile devices, audio data generated by the mobile device and a user identifier associated with the mobile device, and associating, with the audio data, a timestamp indicative of receipt of the audio data at the server;
selecting, among a plurality of user identifiers, a subset of user identifiers whose corresponding audio data and timestamps satisfy predefined similarity criteria, wherein:
the subset of user identifiers includes a first user identifier associated with a first mobile device, a second user identifier associated with a second mobile device, and a third user identifier associated with a third mobile device;
the predefined similarity criteria require that (i) the timestamps of the audio data corresponding to the subset of user identifiers be within a predefined time scope and (ii) the audio data corresponding to the subset of user identifiers have frequency characteristics within a predefined frequency characteristic range;
sending, to the first mobile device, an instant messaging group establishment prompt message including the second user identifier and the third user identifier; and
establishing an instant messaging group including the first user identifier, the second user identifier, and the third user identifier after receiving an instant messaging group establishment request message from an instant messaging client associated with the first mobile device.

11. The server according to claim 10, wherein the programs further include instructions for:
canceling the establishment of an instant messaging group after receiving an instant messaging group cancellation request message from the instant messaging client.

12. The server according to claim 10, wherein the instant messaging group establishment request message includes a group identifier and the instruction for establishing the instant messaging group further includes instructions for:
identifying the first user identifier as a group administrator and the second user identifier as a candidate group member;
forwarding the group identifier and the first user identifier as the group administrator to the second mobile device; and
converting the second user identifier from the candidate group member to a full group member after receiving an acceptance-to-join message from the second mobile device.

13. The server according to claim 12, wherein the instruction for establishing the instant messaging group further includes instructions for:
identifying the third user identifier as a candidate group member;
forwarding the group identifier and the first user identifier as the group administrator to the third mobile device; and
removing the third user identifier from the instant messaging group after receiving a refusal-to-join message from the third mobile device.

14. The server according to claim 10, wherein the first user identifier is chosen as a group administrator for receiving the instant messaging group establishment prompt message when its audio data has an average volume higher than that of the second user identifier and the third user identifier.

15. The server according to claim 10, wherein the instruction for selecting, among a plurality of user identifiers, the subset of user identifiers further comprises instructions for:
obtaining a set of sampled audio frequencies by sequentially sampling predefined audio frequencies of the audio data associated with each of the subset of user identifiers; and
wherein the audio data associated with the first user identifier, the second user identifier and the third user identifier include associated sets of sampled audio frequencies each having at least a predefined number of consecutive sampling frequencies, wherein a difference between the first user identifier, the second user identifier and the third user identifier each consecutive sampling frequency is less than a predefined threshold level.

16. The server according to claim 10, wherein:
the first user identifier is any user identifier logging into an instant messaging application system through a first instant messaging client at the first mobile device; and
the second user identifier is any user, except the first user identifier in the instant messaging application system, logging in to the instant messaging application system through a second instant messaging client at the second mobile device.

17. The server according to claim 10, wherein the programs further include instructions for:
after receiving a first audio data from the first mobile device:
determining whether an average audio frequency of the first audio data is within a preset frequency scope and whether an average volume of the first audio data is within a preset volume scope; and
sending a failure message to the first mobile device when the average audio frequency of the first audio data is not within the preset frequency scope or the average volume of the first audio data is not within the preset volume scope, wherein the failure message is used for prompting a user of the first mobile device to regenerate the audio data.

18. The server according to claim 10, wherein the audio data generated by a mobile device includes audio data of an environment sound surrounding the mobile device.

19. A non-transitory computer readable storage medium storing one or more programs, the one or more programs comprising instructions, which when executed by a server with one or more processors and memory, cause the server to:
receive, from each of a plurality of mobile devices, audio data generated by the mobile device and a user identifier associated with the mobile device, and associating, with the audio data, a timestamp indicative of receipt of the audio data at the server;
select, among a plurality of user identifiers, a subset of user identifiers whose corresponding audio data and timestamps satisfy predefined similarity criteria, wherein:
the subset of user identifiers includes a first user identifier associated with a first mobile device, a second user identifier associated with a second mobile device, and a third user identifier associated with a third mobile device;
the predefined similarity criteria require that (i) the timestamps of the audio data corresponding to the subset of user identifiers be within a predefined time scope and (ii) the audio data corresponding to the subset of user identifiers have frequency characteristics within a predefined frequency characteristic range;
send, to the first mobile device, an instant messaging group establishment prompt message including the second user identifier and the third user identifier; and
establish an instant messaging group including the first user identifier, the second user identifier, and the third user identifier after receiving an instant messaging group establishment request message from an instant messaging client associated with the first mobile device.

20. The non-transitory computer readable storage medium according to claim 19, wherein the server is further configured to cancel the establishment of an instant messaging group after receiving an instant messaging group cancellation request message from the instant messaging client.

* * * * *